United States Patent
Pramod et al.

(10) Patent No.: US 11,515,813 B2
(45) Date of Patent: Nov. 29, 2022

(54) TORQUE RIPPLE COMPENSATION IN MOTOR CONTROL SYSTEMS

(71) Applicant: STEERING SOLUTIONS IP HOLDING CORPORATION, Saginaw, MI (US)

(72) Inventors: Prerit Pramod, Saginaw, MI (US); Julie A. Kleinau, Bay City, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 16 days.

(21) Appl. No.: 16/365,023

(22) Filed: Mar. 26, 2019

(65) Prior Publication Data
US 2019/0296666 A1 Sep. 26, 2019

Related U.S. Application Data

(60) Provisional application No. 62/647,981, filed on Mar. 26, 2018.

(51) Int. Cl.
*H02P 6/10* (2006.01)
*B62D 5/04* (2006.01)
(Continued)

(52) U.S. Cl.
CPC ............ *H02P 6/10* (2013.01); *B62D 5/046* (2013.01); *H02P 21/05* (2013.01); *H02P 21/22* (2016.02); *H02P 29/50* (2016.02)

(58) Field of Classification Search
CPC .. H02P 6/10; H02P 29/50; H02P 21/22; H02P 21/05; B62D 5/046
See application file for complete search history.

(56) References Cited

U.S. PATENT DOCUMENTS 7,574,294 B2   8/2009  Ta et al.
2006/0012323 A1*  1/2006  Endo ............... B62D 5/0463
318/432
(Continued)

FOREIGN PATENT DOCUMENTS

CN   102082543 A   6/2011
CN   104052361 A   9/2014
(Continued)

OTHER PUBLICATIONS

Official Letter received by the German and Patent Trademark Office for related German Patent Application No. 102019107686.2 dated Jan. 25, 2022, 6 page(s).
(Continued)

*Primary Examiner* — Bickey Dhakal
*Assistant Examiner* — Bradley R Brown
(74) *Attorney, Agent, or Firm* — Dickinson Wright PLLC

(57) ABSTRACT

According to one or more embodiments, a motor control system that provides torque ripple compensation includes a current regulator that receives a first current command corresponding to an input torque command. The current regulator further generates a first voltage command based on the first current command using a first transformation matrix. The current regulator further receives a second current command corresponding to a torque ripple to be compensated. The current regulator further generates a second voltage command based on the second current command using a second transformation matrix. The current regulator further computes a final voltage command using the first voltage command and the second current command, the final voltage command being applied to a motor.

19 Claims, 7 Drawing Sheets

(51) Int. Cl.
*H02P 21/05* (2006.01)
*H02P 21/22* (2016.01)
*H02P 29/50* (2016.01)

(56) References Cited

U.S. PATENT DOCUMENTS

| | | | |
|---|---|---|---|
| 2011/0221365 A1* | 9/2011 | Gallegos-Lopez | H02P 25/22 318/400.02 |
| 2014/0021894 A1* | 1/2014 | Simili | H02P 6/10 318/400.23 |

FOREIGN PATENT DOCUMENTS

| | | |
|---|---|---|
| CN | 104579080 A | 4/2015 |
| CN | 109818536 A | 5/2019 |
| CN | 111713006 A | 9/2020 |
| EP | 2575252 A2 | 4/2013 |

OTHER PUBLICATIONS

First Office Action and Search Report received by the Chinese State Intellectual Property Office for related Chinese Patent Application No. 201910233665.X dated Aug. 16, 2022, 7 pages.

* cited by examiner

TORQUE RIPPLE COMPENSATION IN MOTOR CONTROL SYSTEMS

CROSS-REFERENCES TO RELATED APPLICATIONS

This patent application claims priority to U.S. Provisional Patent Application Ser. No. 62/647,981, filed Mar. 26, 2018, and which is incorporated herein by reference in its entirety.

BACKGROUND

The present application generally relates to motor control systems, and particularly addresses technical challenges regarding torque ripple compensation when operating motor control systems.

Industrial applications requiring low cost and high control performance typically employ complex electric drive in motion control systems, where the complexity is introduced in various components such as a power converter and an electric machine, to optimize cost. Generally, such optimization of cost leads to noise, vibration, and harshness (NVH) characteristics of the electrical machines to change, and at times exceed desirable threshold levels.

Typically, electrical machines using permanent magnet synchronous machines (PMSM), which may be operated using a current regulator, produce order tracked torque ripple (including cogging torque) due to non-sinusoidal back-EMF (BEMF) distribution of magnet flux around one or more air gaps in the PMSM. Further, imbalances between three (or more) phases of power used to operate the PMSM result in torque ripple as well. Further, several other machine-specific non-idealities result in torque ripple. Additionally, controlled induced parasitic torques also exist in the drive system of the PMSM.

Such torque ripples further cause the NVH characteristics of the PMSM to degrade. The NVH performance exceeding desirable threshold levels can cause discomfort to operators, for example if the PMSM is part of a steering system, a vehicle, home appliances, or any other system, and even make the system inoperable. Further, NVH can lead to structural damage to the system and/or surroundings. Accordingly, it is desirable to improve the NVH performance of the system.

SUMMARY

Technical solutions are described for torque ripple minimization for permanent magnet synchronous machines. The technical solutions described herein facilitate compensator designs for optimal tracking of pulsating current commands. Further, the technical solutions described herein facilitate decoupling the base current regulation from voltage generation for torque ripple compensation. Further, according to the technical solutions described herein compensators provide zero steady state tracking of pulsating currents at steady state. Further yet, the technical solutions described herein provide d/q axis current control loop decoupling for pulsating current commands.

According to one or more embodiments, a motor control system that provides torque ripple compensation includes a current regulator that receives a first current command corresponding to an input torque command. The current regulator further generates a first voltage command based on the first current command using a first transformation matrix. The current regulator further receives a second current command corresponding to a torque ripple to be compensated. The current regulator further generates a second voltage command based on the second current command using a second transformation matrix. The current regulator further computes a final voltage command using the first voltage command and the second current command, the final voltage command being applied to a motor.

According to one or more embodiments, a method includes providing torque ripple compensation in a motor control system. The torque ripple compensation includes receiving a first current command corresponding to an input torque command. The torque ripple compensation further includes generating a first voltage command based on the first current command using a first transformation matrix. The torque ripple compensation further includes receiving a second current command corresponding to a torque ripple to be compensated. The torque ripple compensation further includes generating a second voltage command based on the second current command using a second transformation matrix. The torque ripple compensation further includes computing a final voltage command using the first voltage command and the second current command, the final voltage command being applied to a motor.

According to one or more embodiments a steering system includes a motor, and a processor that provides torque ripple compensation by performing a method. The method includes providing torque ripple compensation in a motor control system. The torque ripple compensation includes receiving a first current command corresponding to an input torque command. The torque ripple compensation further includes generating a first voltage command based on the first current command using a first transformation matrix. The torque ripple compensation further includes receiving a second current command corresponding to a torque ripple to be compensated. The torque ripple compensation further includes generating a second voltage command based on the second current command using a second transformation matrix. The torque ripple compensation further includes computing a final voltage command using the first voltage command and the second current command, the final voltage command being applied to the motor.

Accordingly, the technical solutions described herein decouple the compensator used for base command tracking and torque ripple compensation. Further, the compensators according to the technical solutions described herein are optimal for tracking ripple compensation because they provide zero steady state error at frequencies of interest (for targeted harmonics), and decouple the d/q axis current loops for pulsating current commands. Further yet, the technical solutions described herein facilitate multiple discrete time implementations to provide ability to designer to choose between performance and complexity.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 depicts a block diagram of a discretization technique using two integrators according to one or more embodiments.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
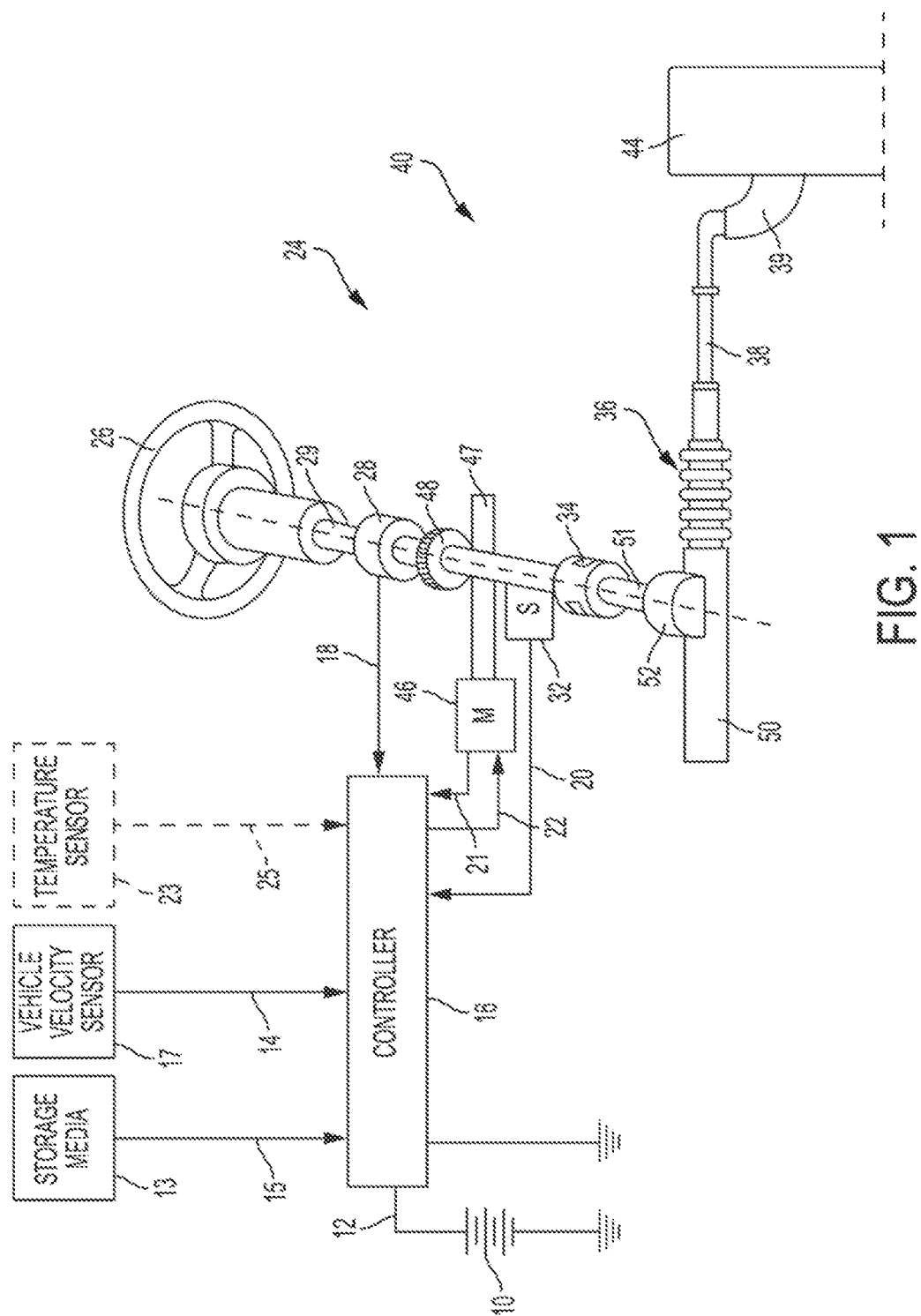
FIG. 1 is an exemplary embodiment of an electric power steering system.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor (PMSM), and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

A technical challenge exists with PMSM based electrical machines such as the EPS 40, because these machines produce order tracked torque ripple (including cogging torque) due to the non-sinusoidal back-EMF (BEMF) distribution of the magnet flux around the air gap. Further, imbalances between three phases of power result in torque ripple as well. Additionally, several other machine-specific non-idealities result in torque ripple. Further yet, controlled induced parasitic torques may also exist in the drive system. As described earlier, such torque ripples result in NVH issues, by degrading the NVH characteristics of the motor control system beyond predetermined threshold values. Thus, a technical challenge exists to improve the NVH performance.

In one or more examples, the minimization may be passive where the machine design itself keeps the non-idealities low. Alternatively, active control algorithms which compensate for the torque ripple may be employed. Typically, such techniques have been developed and employed in machines where feedback control is employed by the controller 16 to perform current control of PMSM 46, because feedback control provides current tracking, disturbance rejection, and tunability at desired levels. Such solutions, typically, inject the appropriate amount of current that produces pulsating torque which is out of phase with the actual torque ripple of the machine. The techniques proposed so far focus on determining the pulsating current commands to compensate the torque ripple, which is then sent as an overlay command to either a feedforward or feedback current controller. These current controller designs are targeted for tracking DC signals, and are not suitable for tracking pulsating commands. The tracking performance of these controllers degrade over operating condition, especially at higher speeds.

The technical solutions described herein address such technical challenges regarding providing torque ripple compensation when tracking pulsating current commands. Further, the technical solutions described herein facilitate simultaneous DC and pulsating current tracking.

The technical solutions described herein further facilitate improving the NVH performance when the controller 16 uses feedback control for current control of the PMSM 46. Further, the technical solutions described herein facilitate substantially zero current tracking error irrespective of the operating condition, thus improving the overall NVH performance of the overall system.

Figure 2:
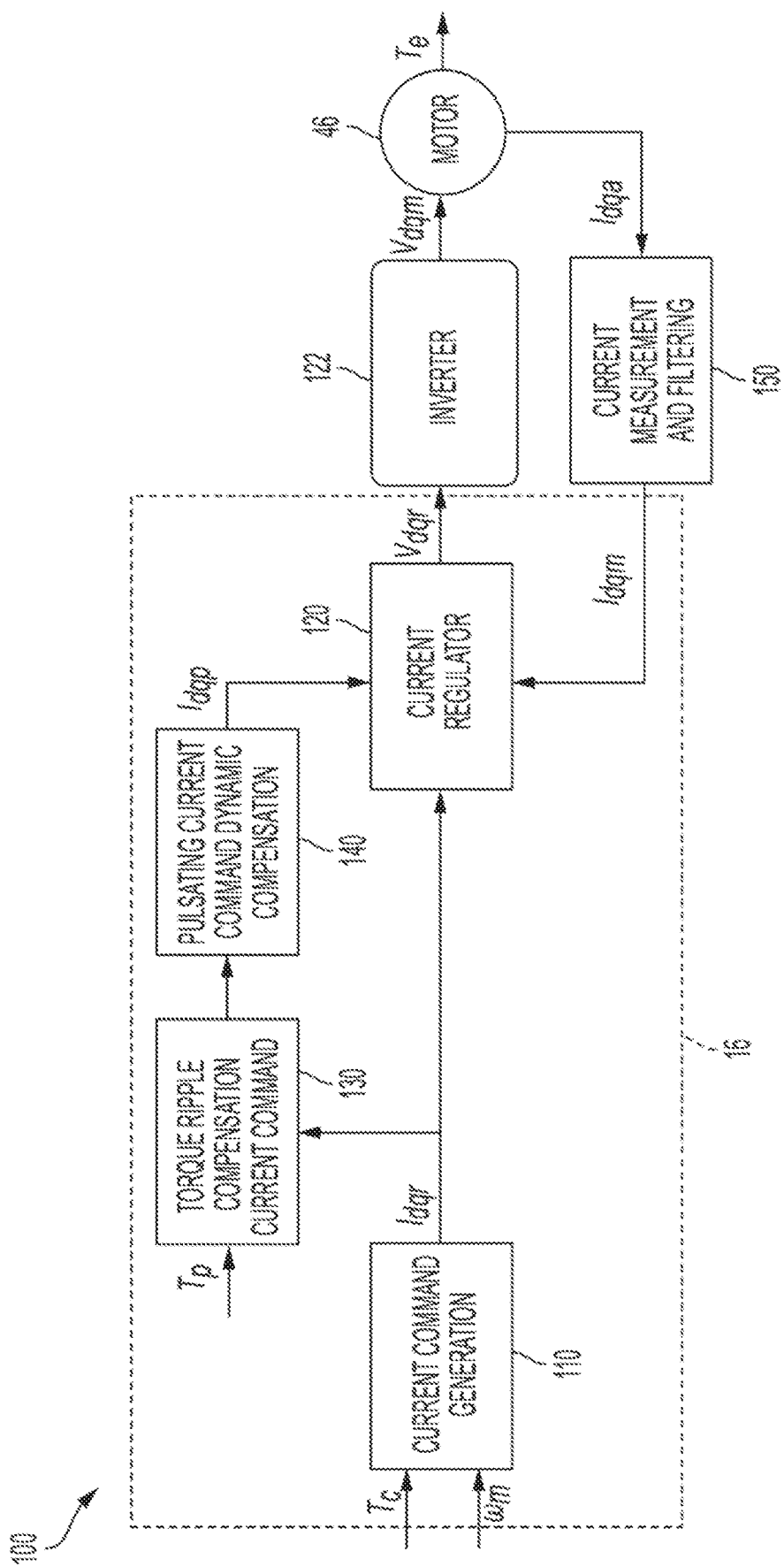
FIG. 2 depicts a block diagram of a motor control system including torque ripple compensation according to one or more embodiments.

FIG. 2 depicts a block diagram of a motor control system including torque ripple compensation according to one or more embodiments. The depicted motor control system 100 may be part of the steering system 40, or any other machine that uses a motor to cause displacement, generation of torque, and the like. In one or more examples, the inverter 122 is connected to the motor 46. In some embodiments, the motor 46 is a poly-phase, permanent magnet synchronous motor (PMSM). In the examples described herein, the motor 46 is considered a three-phase PMSM, however it should be noted that in other examples, the motor 46 may be a poly-phase motor. The control module 16 is connected to the motor 46 through the inverter 122.

As shown in the figure, the controller 16 includes a current command generator 110 that generates a current command ($I_{dqr}$) for a given (average) torque command ($T_c$) at a certain operating condition of motor velocity ($\omega_m$) and DC link voltage ($V_{DC}$) (not shown). Here, $I_{dqr}$ includes a d-axis component ($I_d$) and a q-axis component ($I_q$). Any known technique may be used for the current command generation for optimizing proper choice of the reference currents to use for PMSM control. The current commands in the d/q axis are then sent to the current regulator 120. The current regulator 120 converts input current commands into voltage command ($V_{dqr}$), which are then applied to the motor 46 via the inverter 122. In one or more examples, a PWM converter (not shown) may also be used.

In order to perform torque ripple compensation, additional pulsating current signals ($I_{dqp}$) in the d/q axis are injected by a pulsating current command dynamic compensation module 140 in response to a compensation command from a torque ripple compensation command generation block 130. The additional pulsating current signals ($I_{dqp}$) are added to the base current command ($I_{dqr}$). The torque ripple compensation module 130 generates the compensation command that causes the corresponding additional pulsating current signals ($I_{dqp}$) in the d/q axis. The compensation command based on detecting pulsations ($T_P$) in rack-force on the rack of the steering system 40. The pulsating current signals ($I_{dqp}$) are typically determined experimentally and have predetermined values that are preconfigured (not dynamically generated according to the pulsations). Before addition of the pulsating commands, pre-compensation is typically performed to account for control (and machine) related bandwidth limitations. The current regulator 120 receives the pulsating current signals corresponding to torque ripple compensation command ($I_{dqp}$) and adds the pulsating current signals to the base current command ($I_{dqr}$) when generating the voltage command ($V_{dqr}$).

Further, the actual (output) current ($I_{dqa}$) is measured by the current measurement and filtering system 150 and the measured current ($I_{dqm}$) is fed back to the current regulator 120.

Figure 3:
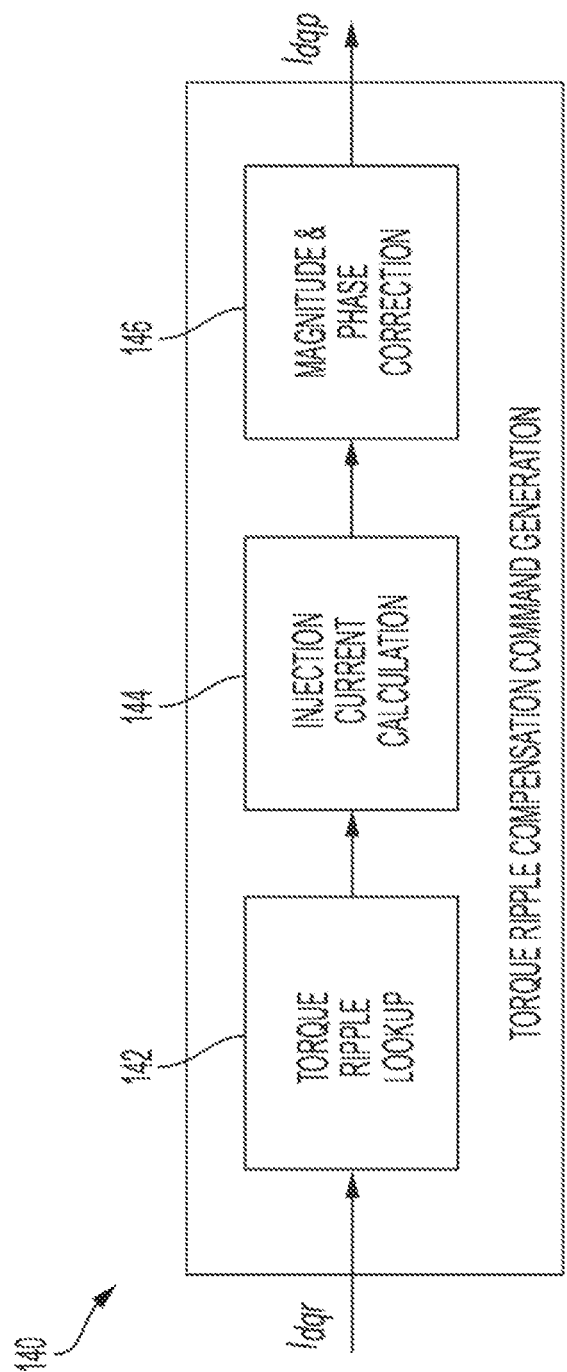
FIG. 3 depicts a block diagram of an example torque ripple compensation module according to one or more embodiments.

FIG. 3 depicts a block diagram of an example torque ripple compensation module according to one or more embodiments. The torque ripple compensation module includes, among other components, a torque ripple lookup 142, an injection current calculation 144, and a magnitude and phase correction 146.

The torque ripple (including cogging) of the machine, such as PMSM 46 in EPS 40, is determined offline, for example, by running constant low-speed tests at constant current or torque levels and recording the torque data. The torque data is decomposed into harmonic orders that are further compensated. The data for torque ripple that is to be compensated is first determined offline and then loaded into lookup tables for each order in the controller 16. The torque ripple lookup 142 facilitates accessing the lookup tables, and providing a torque ripple value from the lookup tables corresponding to the current command ($I_{dqr}$). Thereafter, the injection current calculation 144 uses a machine model, that is preconfigured, of the machine using the PMSM 46 to compute optimal d and/or q axis current commands. In one or more examples, the calculation is performed online, i.e. dynamically during runtime of the machine. Alternatively, in one or more examples, the calculation is performed offline, and corresponding d/q axis values for the torque ripple value determined are stored in another lookup table(s), accessible via the torque ripple lookup 142. The d/q axis current values are computed using the machine model such that when supplied to the PMSM 46 produce a pulsating torque that cancels out the actual torque ripple of the machine.

Further, the magnitude and phase correction 146 compensates for additional effects, such as speed dependent variation of the machine torque ripple, limitations of current controller bandwidth etc. This compensation is done through variation of the magnitude and phase of the pulsating current as a function of the operating conditions that are input to the control module 16, including machine speed ($\omega_m$), torque command ($T_c$), and currents.

The machine model used for such computations may be a mathematical model of the PMSM 46, such as follows:

$$V_d = L_d \frac{dI_d}{dt} + RI_d + \frac{N_p}{2}\omega_m L_q I_q$$

$$V_q = L_q \frac{dI_q}{dt} + RI_q - \frac{N_p}{2}\omega_m L_d I_d + K_e \omega_m$$

$$T_e = \frac{3}{2}K_e I_q + \frac{3}{4}N_p(L_q - L_d)I_d I_q$$

Here $V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF coefficient (in Volts/rad/s), $\omega_m$ is the mechanical motor velocity in (in rad/s), and $T_e$ is the electromagnetic motor torque (in Nm). Motor parameters vary (substantially) during operation. In one or more examples, there may be over 100% variation in R, and 5-20% variation in inductances $L_d$, $L_q$, and 15-20% in $K_e$. For example, R varies with build and temperature, $L_q$, $L_d$ vary due to saturation (i.e., as a function of $I_q$ and $I_d$), and $K_e$ varies due to saturation (as a function of $I_q$) and with temperature. It should be noted that the torque equation is nonlinear and represents sum of the torque developed by leveraging the magnetic field from the permanent magnets, and the reluctance torque generated by rotor saliency (difference between $L_d$ and $L_q$) and predetermined values of $I_q$ and $I_d$.

The machine model in the frequency domain may be written as follows.

$$V_d = (L_d s + R)I_d + \omega_e L_q I_q$$

$$V_q = (L_q s + R)I_q - \omega_e L_d I_d + K_e \omega_m$$

The above model represents a typical PMSM machine, and does not describe the pulsating components. The motor electrical velocity $\omega_e$ is equal to the pole pairs $$\frac{N_p}{2}$$

times the motor mechanical velocity $\omega_m$.

In one or more examples, the machine model includes harmonic components which is not part of the model represented above. These harmonic components show up both in the voltage and torque equations, and the technical solutions described herein may be used with such models as well.

As described earlier, the technical solutions described herein perform torque ripple compensation by injecting additional pulsating current commands which produce pulsating torque that are out of phase with the actual torque ripple of the machine. The actual torque of the PMSM 46 including torque ripple may be:

$$T_e = \frac{3}{2}K_e I_q + \frac{3}{2}\frac{N_p}{2}(L_q - L_d)I_d I_q + T_p$$

where $T_p$ is the pulsating torque and is order tracked to the rotation of the PMSM 46, i.e., the frequencies of the pulsating torque components are integral multiples of the instantaneous motor velocity. This may be mathematically represented using a Fourier Series as follows.

$$T_p = \sum_{n=1}^{\infty} T_n(I_d, I_q)\sin(n\theta + \phi_n(I_d, I_q))$$

where n is the harmonic order, $\theta$ is the electrical position and $T_n$, $\phi_n$ are the magnitude and phase respectively of the torque ripple at that harmonic number.

Typically, both $T_n$ and $\phi_n$ are functions of the actual currents $I_{dq}$ of the PMSM 46. Therefore, in order to compensate the torque ripple, one way of computing the pulsating current $I_{qp}$ to be injected is as follows $$I_{qp} = \frac{-T_p}{\frac{3}{2}K_e + \frac{3}{2}\frac{N_p}{2}(L_q - L_d)I_d}$$

$$= -\sum_{n=1}^{\infty} \frac{T_n(I_d, I_q)}{K_e + \frac{3}{2}\frac{N_p}{2}(L_q - L_d)I_c}\sin(n\theta + \phi_n(I_d, I_q))$$

In one or more examples, only the pulsating q-axis current component is injected, while d-axis current component is kept constant. Further, the final q-axis current command becomes the sum of $I_{qr}$ and $I_{qp}$, which is sent to the current regulator 120 as input. As depicted in the above notation, the pulsating current $I_{qp}$ is a summation of all the harmonic orders of the torque ripple being compensated.

Alternatively, in one or more examples, pulsating components in both, the d and the q axis currents may be injected to compensate the torque ripple. The current regulator 120 receives the $I_{qp}$ and/or the $I_{dp}$ components to produce the appropriate currents that compensate the torque ripple of the machine.

Figure 4:
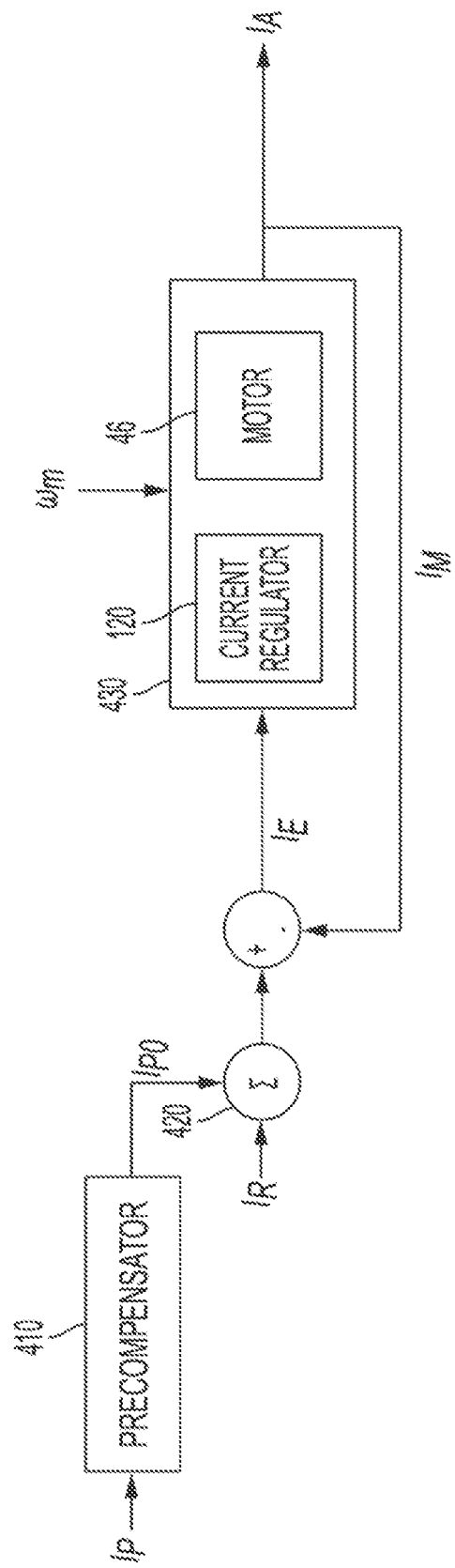
FIG. 4 depicts typical torque ripple compensation architecture.

FIG. 4 depicts typical torque ripple compensation architecture. Here, the pre-compensator ($R_B$) 410 is applied to the pulsating commands. The pulsating commands $I_{dqp}$ are now represented as $I_P$. The compensated pulsating current signals ($I_{PO}$) are added with the base (reference) current command ($I_R$), at 420. In one or more examples, the output current ($I_M$) of the system (for example, measured across the motor 46) is fed back into the system, at 420. The fed back measured current is subtracted from the sum of the base current command the pulsating current signals.

The resulting current command $I_E$ is compensated by a compensator 430 to generate the output current $I_A$. The compensation is performed one or more known techniques that typically depend on the motor speed. Accordingly, as depicted by the typical architecture in FIG. 4, the closed loop transfer matrix (T) from the reference current command ($I_R$) to actual current ($I_A$), which is the measured current ($I_M$), can be expressed as follows for the torque pulse compensating motor control system.

$$I_A = T(I_R + R_B I_P) = T I_R + T R_B I_P$$

The transfer matrix T includes four individual transfer functions as shown below.

$$T = \begin{bmatrix} T_{dd} & T_{dq} \\ T_{qd} & T_{qq} \end{bmatrix}$$

In general, the pre-compensator $R_B$ 410 is chosen to be a function of the base current control closed loop transfer matrix above as follows.

$$R_B = \begin{bmatrix} 0 & 0 \\ 0 & \tilde{T}_{qq}^{-1} \end{bmatrix}$$

Accordingly, the torque ripple tracking transfer matrix (T) becomes unity and ensures desired tracking. However, in practice obtaining $\tilde{T}_{qq}^{-1}$ is difficult (because it must be determined experimentally) and is usually determined at nominal operating conditions, which can be different from those in actual usage. Further, as mentioned earlier, for the torque ripple compensation problem, only order tracked harmonics are targeted. Thus, only certain specific torque ripple components that have frequencies equal to integral multiples of the electrical motor velocity $\omega_e$ are compensated. A problematic torque ripple content is produced due to non-sinusoidal back-EMF (BEMF) of the motor, which are typically at multiples of sixth electrical orders, i.e., at $6\omega_e$, $12\omega_e$ etc, and thus pulsating currents at these frequencies need to be injected.

The embodiments of the technical solutions described herein provide compensator designs which act on the base torque ripple compensation current command ($I_R$) and can track the pulsating reference even under the presence of time delays. Such compensators can be placed in parallel with the original base regulator that is intended for tracking the base current commands for producing the average torque. The compensation scheme provided by the embodiments of the technical solutions described herein facilitate the removal of the pre-compensation block 410, because the pulsating command tracking is achieved irrespective of the dynamics of the rest of the control structure or plant. It should be noted that the stability of the system is ensured through proper tuning of the compensator parameters.

Figure 5:
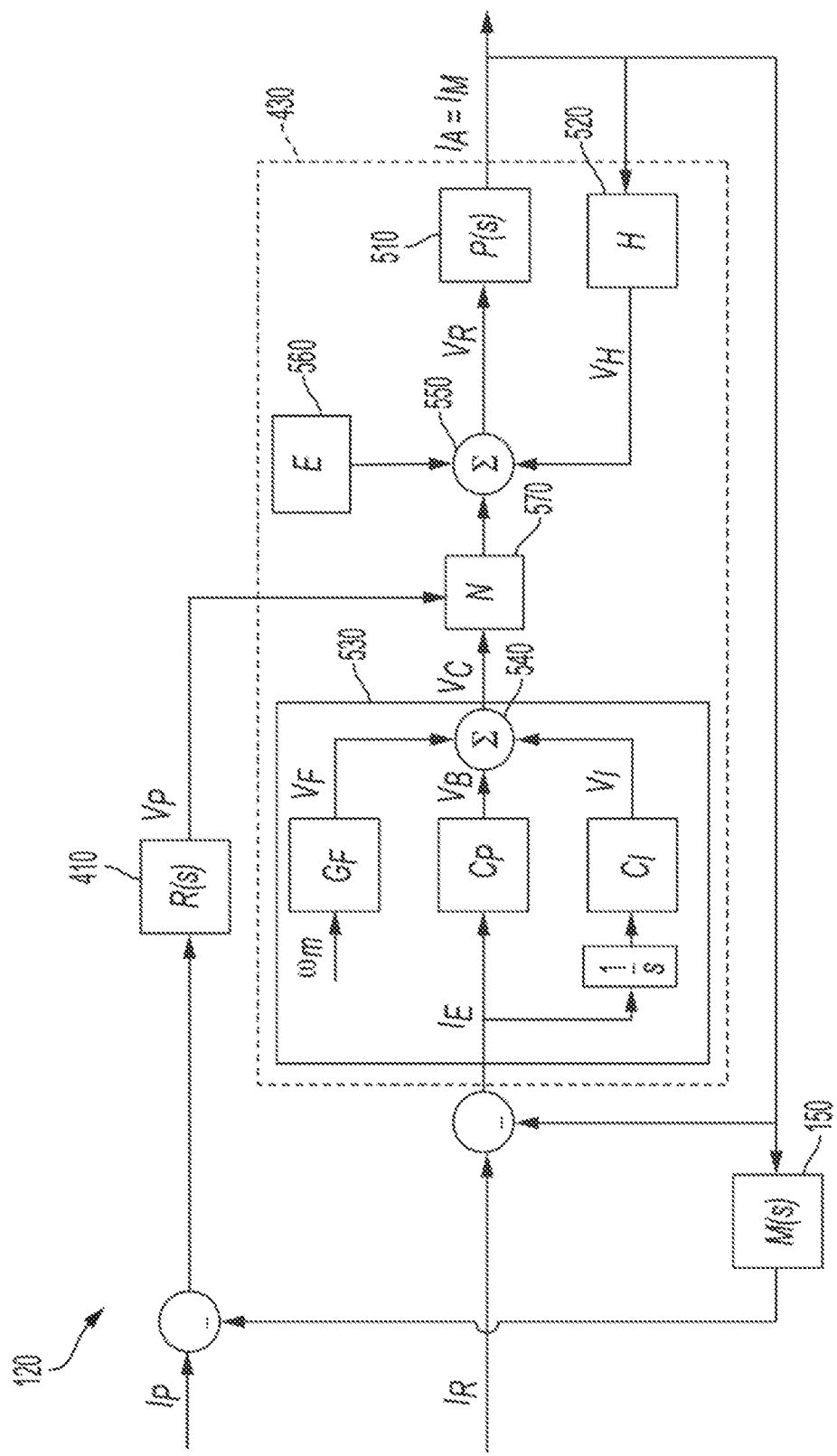
FIG. 5 depicts a block diagram of compensation technique according to one or more embodiments.

FIG. 5 depicts a block diagram of compensation technique according to one or more embodiments. The architecture of the current regulator 120 depicted in FIG. 5 address the technical challenges described herein and facilitates tracking the torque pulsations. The technical challenge is addressed by using separate compensators, a first compensator 410 for the pulsating current signals ($I_P$), and a second compensator 530 for the base current command ($I_R$). Each compensator can be configured separately using respective transfer matrix.

The two transfer matrices combined together provide the current control transfer matrix for the current regulator 120 overall, and in this case can be expressed as follows:

$$I_A = T_N C I_R + T_N R I_P; \text{ where } T_N = (P^{-1} - H + MR + C)^{-1}$$

Here, P 510 represents a model of the plant/system, H 520 represents feedback voltage estimate based on the output current $I_A$, M is the measured current $I_M$, and C is transfer matrix for converting the base current command into corresponding voltage.

Accordingly, the two transfer matrices for the base current command (C) and pulsating current commands (R) can be configured separately. Here, C is configured as is known to generate a first voltage command $V_C$ corresponding to the base current command ($I_R$). In one or more examples, $V_C$ is generated based on the current command $I_E$, which is computed by subtracting feedback of the measured current $I_M$ from the reference current command $I_R$. The $V_C$ is added (at 540) with $V_P$ that is generated based on the pulsating current signals ($I_P$) by the first compensator 410.

The first compensator R(s) 410 is selected to include proportional-resonant (PR) controllers because an integrator tracks a step input because it provides an infinite open loop gain at a frequency of s=0. Further, the internal model principle provides that if in place of an integrator, a controller that has an infinite open loop gain at the frequency that needs to be tracked is used, the steady state error is zero. Such a controller is usually referred to as a resonant controller, and is sometimes called a "generalized integrator". A vector proportional-integral (VPI) controller, which is used as the first compensator 410, is configured to be a type of PR controller by using a transfer function as follows.

$$R_{VPI}(s) = \frac{K_P s^2 + K_I s}{s^2 + \omega_0^2} = (K_P s + K_I)\left(\frac{s}{s^2 + \omega_0^2}\right)$$

The controller therefore has infinite open loop gain at a frequency of $s = \pm j\omega_0$. In the decoupled control configuration, the "effective" plant 510 in either of the current loops has a transfer function as follows.

$$P(s) = \frac{1}{L_{dq}s + R}$$

The gains of the VPI controller are setup as follows.

$$K_{prdq} = \omega_{dqr}\tilde{L}_{dq}$$

$$K_{irdq} = \omega_{dqr}\tilde{R}$$

The open loop transfer function can be expressed as follows.

$$G(s) = C(s)P(s) = (K_{prdq}s + K_{irdq})\left(\frac{s}{s^2 + \omega_0^2}\right)\left(\frac{1}{Ls + R}\right) = \frac{\omega_{dqr}s}{s^2 + \omega_0^2}$$

The resulting closed loop transfer function may thus be expressed as follows.

$$T_N(s) = \frac{G(s)}{1 + G(s)} = \frac{\omega_{dqr}s}{s^2 + \omega_{dqr}s + \omega_0^2}$$

The $V_C$ is added (at 540) with $V_P$ that is generated based on the pulsating current signals ($I_P$) by the first compensator 410. Further, a feedback voltage $V_H$ is added (at 550) to generate the voltage $V_R$, which is applied to the plant 510 (motor). The feedback voltage $V_H$ is based on the measured/output current $I_M$. In one or more examples, a back-emf of the motor 46 is depicted (560) and is also shown as being added (at 550) when generating the voltage command. The back-emf can be based on scaling the motor velocity, however, any other type of back-emf calculation can be used. Also, an inverter model (570) is shown that converts the $V_C$ to $V_R$.

The measured current $I_M$ is also subtracted from the pulsating current signals $I_P$ in one or more examples. Further, in one or more examples, the current measurement and filtering system 150 (M) can adjust the feedback current that is provided to adjust the pulsating current signals $I_P$. For example, the current measurement and filtering system 150 can use an identity matrix as a transformation matrix so that the measured current $I_M$ is used to adjust the pulsating current signals $I_P$. In this case, the measured current is fed back without any filtering (adjustments). Alternatively, the current measurement and filtering system 150 can use any other transformation matrix (non-identity) so that the feedback current used to adjust the pulsating current signals $I_P$ is different than the measured current $I_M$ that is used to adjust the base current command $I_R$.

Accordingly separate compensation performed for the pulsating current signals and the base current command to track order-based sinusoidal commands caused by the torque ripples. It should be noted that physically decoupling compensators is not necessary for PR controllers to track order-based sinusoidal commands, and the assumption is made here simply for simplicity of description of the technical solutions herein. In one or more examples, a single compensator can be programmed/configured such that it performs separate compensation for the separate current command components.

Figure 6:
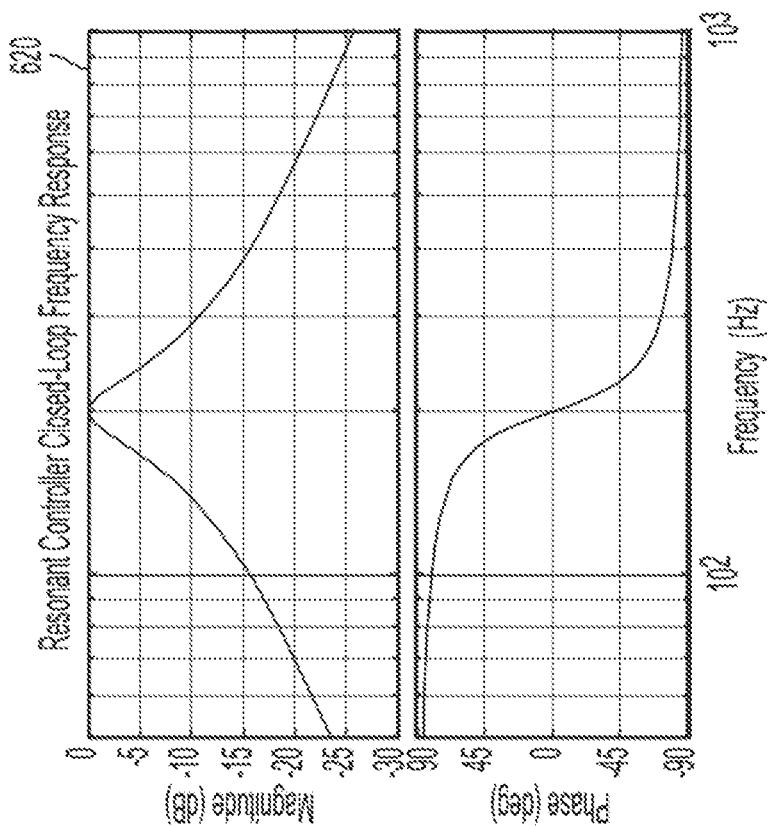
FIG. 6 depicts frequency response plots of open loop and closed loop transfer functions according to one or more embodiments.
Figure 6:
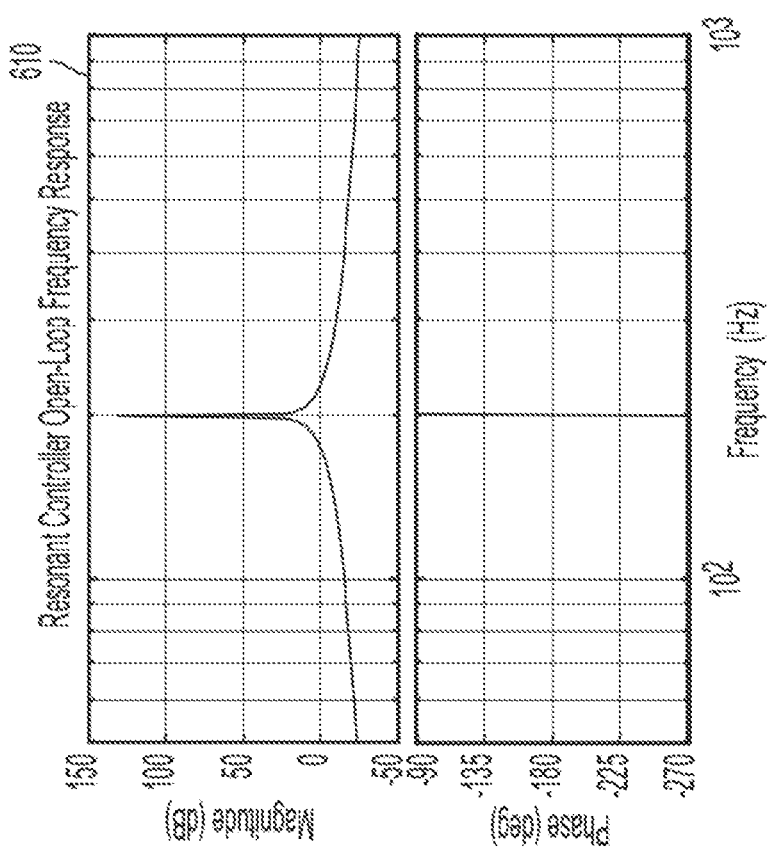

FIG. 6 depicts frequency response plots of open loop (G(s)) 610 and closed loop (T(s)) 620 transfer functions according to one or more embodiments. The depicted frequency response plots are for an example scenario, and it is understood that the frequency response plots can vary in one or more examples.

According to one or more embodiments of the technical solutions described herein, the resonant frequency of the PR controller can be $6\omega_e$, $12\omega_e$ etc., or any order tracker frequency $n\omega_e$, where n is an arbitrary integer.

Figure 7:
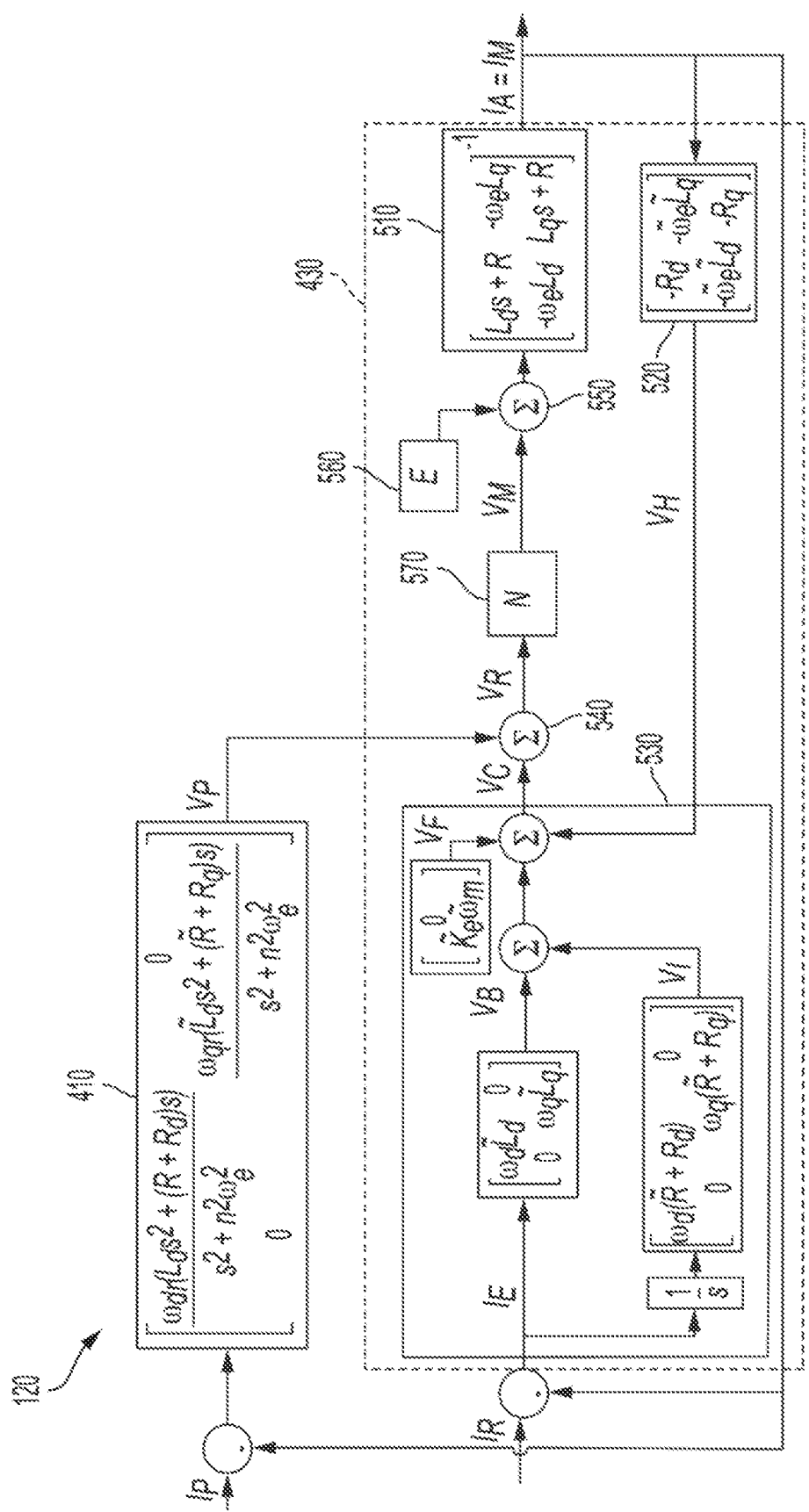
FIG. 7 depicts an overall transfer matrix block diagram according to one or more embodiments for providing a control scheme for torque ripple compensation.

FIG. 7 depicts an overall transfer matrix block diagram according to one or more embodiments for providing a control scheme for torque ripple compensation. In this figure, the current measurement and filtering system is not shown because it is configured to use an identity matrix. Two PR controllers are employed in the two current loops for torque ripple compensation for each harmonic order being compensated. Therefore, the depicted architecture can work effectively with systems where ripple compensation is performed through injection of both d-axis and q-axis currents simultaneously. Further, a portion of the amount of harmonization between the base (DC) PI-type regulator and the PR is required. In one or more examples, the PR controller is not valid at zero speeds, and hence, its output is ramped down to zero (and its minimum frequency range limited) as the system approaches a predetermined minimum value of $\omega_e$. Further, the gains of the PR controller may be simplified in terms of machine parameters as follows.

$$K_{pdqr} = \omega_{dqr}\tilde{L}_{dq}$$

$$K_{idqr} = \omega_{dqr}\tilde{R}$$

The $\omega_{dqr}$ terms are the bandwidth-equivalent terms (for base PI-type controllers) for resonant controllers. Because the PR controller can only produce the desired frequency response at the resonant frequency, the discretization is performed using a bilinear transform with pre-warping with the critical frequency set to the resonant frequency as shown below.

$$s = \frac{n\omega_e}{\tan\left(\frac{n\omega_e T_s}{2}\right)} \frac{1 - z^{-1}}{1 + z^{-1}}$$

In one or more examples, this discretization technique can be computationally complex especially for a PR controller with limited computational resources. Accordingly, a computationally efficient technique using two integrators may be used instead.

Technical solutions are described for torque ripple minimization for permanent magnet synchronous machines. The technical solutions described herein facilitate compensator designs for optimal tracking of pulsating current commands. Further, the technical solutions described herein facilitate decoupling the base current regulation from voltage generation for torque ripple compensation. Further, according to the technical solutions described herein compensators provide zero steady state tracking of pulsating currents at steady state. Further, the technical solutions described herein provide d/q axis current control loop decoupling for pulsating current commands. The technical solutions described herein further facilitate multiple discrete time implementations to provide ability to designer to choose between performance and complexity. The technical solutions described herein can be practically implemented in several systems, such as motor control systems that are affected by torque ripple compensation. As one possible example, the use of the torque ripple compensating motor control system is described herein in the context of a steering system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A motor control system that provides torque ripple compensation, the motor control system comprising:
    a current regulator configured to:
        receive a first current command corresponding to an input torque command;
        receive a second current command corresponding to a torque ripple to be compensated;
        receive a measured current;
        determine a first feedback current based on the measured current;
        generate a first voltage command based on the first current command and the measured current using a first compensator transfer matrix;
        generate a second voltage command based on the second current command and the first feedback current using a second compensator transfer matrix and based on motor inductance, motor circuit resistance, and motor velocity, wherein the second compensator transfer matrix includes at least one resonant controller, the at least one resonant controller having an infinite gain at a frequency corresponding to the torque ripple to be compensated;
        compute a final voltage command using the first voltage command, the second voltage command, the final voltage command being applied to a motor, wherein the first voltage command is added to the second voltage command.

2. The motor control system of claim 1, wherein the second current command provides tracking of pulsating current commands corresponding to the torque ripple.

3. The motor control system of claim 1, wherein the current regulator decouples voltage command generation for the input torque command from voltage generation for the torque ripple to be compensated by using the first compensator transfer matrix that is distinct from the second compensator transfer matrix.

4. The motor control system of claim 1, wherein the current regulator is configured to decouple d/q axis current control loop for pulsating current commands corresponding to the second current command.

5. The motor control system of claim 1, wherein generating the voltage commands by the current regulator comprises:
    determining the first voltage command using the first current command and further based on the motor inductance, the motor circuit resistance, and the motor velocity.

6. The motor control system of claim 1, wherein generating the final voltage command further comprises:
    determining a third voltage command corresponding to a back-emf of the motor; and
    adding the first voltage command, the second voltage command, and the third voltage command.

7. The motor control system of claim 1, wherein the second current command (Idqp) is for a single order torque ripple.

8. The motor control system of claim 1, wherein the second current command (Idqp) is for multi-ordered torque ripple, the voltage command compensating the multi-ordered torque ripple simultaneously.

9. The motor control system of claim 1, further comprising:
    a current measurement and filtering system configured to:
        subtract the first feedback current from the first current command prior to generating the first voltage command; and compute a second feedback current that is subtracted from the second current command prior to generating the second voltage command.

10. A method comprising:
providing torque ripple compensation in a motor control system, the torque ripple compensation comprising:
receiving a first current command corresponding to an input torque command;
receiving a second current command corresponding to a torque ripple to be compensated;
receive a measured current;
determine a first feedback current based on the measured current;
generate a first voltage command based on the first current command and the measured current using a first compensator transfer matrix;
generating a second voltage command based on the second current command and the feedback command using a second compensator transfer matrix and based on motor inductance, motor circuit resistance, and motor velocity, wherein the second compensator transfer matrix includes at least one resonant controller, the at least one resonant controller having an infinite gain at a frequency corresponding to the torque ripple to be compensated; and
computing a final voltage command using the first voltage command, the second voltage command, the final voltage command being applied to a motor, wherein the first voltage command is added to the second voltage command.

11. The method of claim 10, wherein the current regulator decouples voltage command generation for the input torque command from voltage generation for the torque ripple to be compensated by using the first compensator transfer matrix that is distinct from the second compensator transfer matrix.

12. The method of claim 10, wherein the current regulator is configured to decouple d/q axis current control loop for pulsating current commands corresponding to the second current command.

13. The method of claim 10, wherein the second current command (Idqp) is for a single order torque ripple.

14. The method of claim 10, wherein the second current command (Idqp) is for multi-ordered torque ripple, the voltage command compensating the multi-ordered torque ripple simultaneously.

15. A steering system comprising:
a motor; and
a processor that provides torque ripple compensation by performing a method comprising:
receiving a first current command corresponding to an input torque command;
receiving a second current command corresponding to a torque ripple to be compensated;
receive a measured current;
determine a first feedback current based on the measured current;
generate a first voltage command based on the first current command and the measured current using a first compensator transfer matrix;
generating a second voltage command based on the second current command and feedback current using a second compensator transfer matrix and based on motor inductance, motor circuit resistance, and motor velocity, wherein the second compensator transfer matrix includes at least one resonant controller, the at least one resonant controller having an infinite gain at a frequency corresponding to the torque ripple to be compensated; and
computing a final voltage command using the first voltage command, the second voltage command, the final voltage command being applied to the motor, wherein the first voltage command is added to the second voltage command.

16. The steering system of claim 15, wherein the processor decouples voltage command generation for the input torque command from voltage generation for the torque ripple to be compensated by using the first compensator transfer matrix that is distinct from the second compensator transfer matrix.

17. The steering system of claim 15, wherein the processor decouples d/q axis current control loop for pulsating current commands corresponding to the second current command.

18. The steering system of claim 15, wherein the second current command (Idqp) is for a single order torque ripple.

19. The steering system of claim 15, wherein the second current command (Idqp) is for multi-ordered torque ripple, the voltage command compensating the multi-ordered torque ripple simultaneously.

* * * * *